US012389247B2

(12) United States Patent
Ashiwal et al.

(10) Patent No.: US 12,389,247 B2
(45) Date of Patent: Aug. 12, 2025

(54) UPLINK CARRIER AGGREGATION ANTENNA CONTENTION RESOLUTION

(71) Applicant: Apple Inc., Cupertino, CA (US)

(72) Inventors: Vijendrakumar K Ashiwal, San Jose, CA (US); Vijay Venkataraman, San Jose, CA (US); Tiberiu Muresan, San Jose, CA (US); Sharad Garg, Cupertino, CA (US); Jia Tang, San Jose, CA (US); Pengkai Zhao, Cupertino, CA (US); Zhu Ji, Cupertino, CA (US); Vijay Gadde, San Jose, CA (US); Dikshit Garg, San Jose, CA (US); Tarakkumar G Dhanani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 547 days.

(21) Appl. No.: 17/830,156

(22) Filed: Jun. 1, 2022

(65) Prior Publication Data

US 2023/0397024 A1 Dec. 7, 2023

(51) Int. Cl.
*H04W 24/08* (2009.01)
*H04L 5/00* (2006.01)

(52) U.S. Cl.
CPC ............. *H04W 24/08* (2013.01); *H04L 5/001* (2013.01)

(58) Field of Classification Search
CPC .. H04W 24/08; H04W 72/0453; H04L 5/001; H04L 5/0091; H04L 5/0092; H04L 5/0094; H04L 5/0096; H04L 5/0098; H02W 24/10
See application file for complete search history.

(56) References Cited

U.S. PATENT DOCUMENTS

| 8,644,199 | B2 * | 2/2014 | Papasakellariou | ...... H04L 5/001 455/450 |
| 10,153,867 | B2 * | 12/2018 | Chen | ..................... H04L 1/1854 |
| 10,206,223 | B2 * | 2/2019 | Belghoul | .................. H04L 5/14 |
| 11,575,491 | B2 * | 2/2023 | Kwak | ..................... H04L 5/001 |
| 11,612,001 | B2 * | 3/2023 | Deenoo | ................ H04L 5/0098 |
| 11,695,459 | B2 * | 7/2023 | Khoryaev | ............ H04B 7/0695 375/267 |

(Continued)

FOREIGN PATENT DOCUMENTS

WO WO-2020150641 A1 * 7/2020 ............. H04B 7/024

OTHER PUBLICATIONS

Lee et al, "A Survey of Radio Resource Management for Spectrum Aggregation in LTE-Advanced", 2014, IEEE Communications Surveys & Tutorials (Year: 2014).*

*Primary Examiner* — Andrew W Chriss
(74) *Attorney, Agent, or Firm* — Kowert, Hood, Munyon, Rankin & Goetzel, P.C.

(57) ABSTRACT

A wireless device may comprise antennas and a processor configured to cause the wireless device to determine preferred antenna ports for at least one primary component carriers (PCCs) and at least one secondary component carriers (SCCs) based on performed downlink measurements of antenna ports. The wireless device may further determine support capabilities of the wireless device and perform computations using additional measurements of the antenna ports. Based on the computations, the wireless device may assign the preferred antenna ports to the PCCs and SCCs and perform uplink transmission using the assigned antenna ports.

20 Claims, 8 Drawing Sheets

(56) References Cited

U.S. PATENT DOCUMENTS

| | | | |
|---|---|---|---|
| 2018/0234149 A1* | 8/2018 | Zhang | H04B 7/0626 |
| 2020/0044705 A1* | 2/2020 | Sridharan | H04B 7/0456 |
| 2020/0100290 A1* | 3/2020 | Mundarath | H04B 7/0695 |
| 2022/0095238 A1* | 3/2022 | Huang | H04L 1/1692 |
| 2022/0190886 A1* | 6/2022 | Islam | H04W 72/1268 |
| 2023/0099006 A1* | 3/2023 | Popescu | G06N 20/20 370/252 |

\* cited by examiner

UPLINK CARRIER AGGREGATION ANTENNA CONTENTION RESOLUTION

FIELD

The present application relates to wireless devices, and more particularly to apparatuses, systems, and methods for uplink carrier aggregation antenna contention resolution.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for uplink carrier aggregation antenna contention resolution.

A wireless device may comprise one or more antennas and at least one processor coupled to the one or more antennas. The at least one processor may be configured to cause the wireless device to perform one or more downlink measurements of one or more antenna ports associated with the one or more antennas. Additionally or alternatively, the at least one processor may be configured to cause the wireless device to determine, based on the one or more downlink measurements, one or more preferred antenna ports of the one or more antenna ports for at least one primary component carriers (PCCs) and at least one secondary component carriers (SCCs), according to some embodiments. In some embodiments, the at least one processor may be configured to cause the wireless device to determine one or more support capabilities of the wireless device and network corresponding to the at least one PCC and the at least one SCC utilizing the one or more preferred antenna ports for uplink transmission. The wireless device may be further configured to perform one or more additional measurements of the one or more preferred antenna ports corresponding to the at least one PCC and at least one SCC and one or more computations using the one or more additional measurements. The wireless device may be further configured to assign, based on the one or more computations, the one or more preferred antenna ports to the at least one PCC and at least one SCC for uplink transmission and perform, on the one or more preferred antenna ports, uplink transmission using the respectively assigned at least one PCC and at least one SCC.

According to some embodiments, the at least one processor may be configured to cause the wireless device to determine one or more additional capabilities of least one of the network or the wireless device corresponding to support of at least one of a physical uplink control channel (PUCCH) or a random access channel (RACH) on the at least one SCC. Additionally or alternatively, the at least one processor may be configured to cause the wireless device to determine, based on one or more additional computations, that an additional PCC or an additional SCC of the at least one SCC associated with the network should utilize a second preferred antenna port of the one or more antennas.

In some embodiments, the one or more additional measurements may comprise reference signal received power (RSRP) measurements of at least one of the at least one PCC and at least one SCC. Additionally or alternatively, the one or more measurements may comprise total radiated power (TRP) measurements of at least one of the at least one PCC and at least one SCC. According to further embodiments, the one or more computations may comprise applying a scaling factor for the TRP measurements of at least one SCC. Moreover, the one or more measurements may include using one or more bandwidths (BWs) of the at least one PCC and at least one SCC, according to some embodiments. Additionally or alternatively, the one or more BWs may correspond to at least one of single band BWs or aggregated BWs for contiguous bands. In some embodiments, the one or more computations may include applying a weighting factor for the one or more BWs.

According to some embodiments, the wireless device's determining of the one or more capabilities may be in response to an event trigger. Moreover, the event trigger may comprise at least one of a periodic timer, a handover procedure, a change in cellular state, a change in radio access technology (RAT), exiting a service area, or entering an airplane mode, according to some embodiments. Additionally or alternatively, a change in cellular state may corresponds to changing states between at least one of an idle state, a connected state, or an out-of-service (OOS) state.

In some embodiments, assigning the one or more preferred antenna ports to the at least one PCC and at least one SCC for uplink transmission may include prioritizing a first PCC of the at least one PCC such that it is assigned a first antenna port of the one or more preferred antenna ports. Additionally or alternatively, assigning the one or more preferred antenna ports to the at least one PCC and at least one SCC for uplink transmission may include prioritizing a first SCC of the at least one SCC such that it is assigned a first antenna port of the one or more preferred antenna ports.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
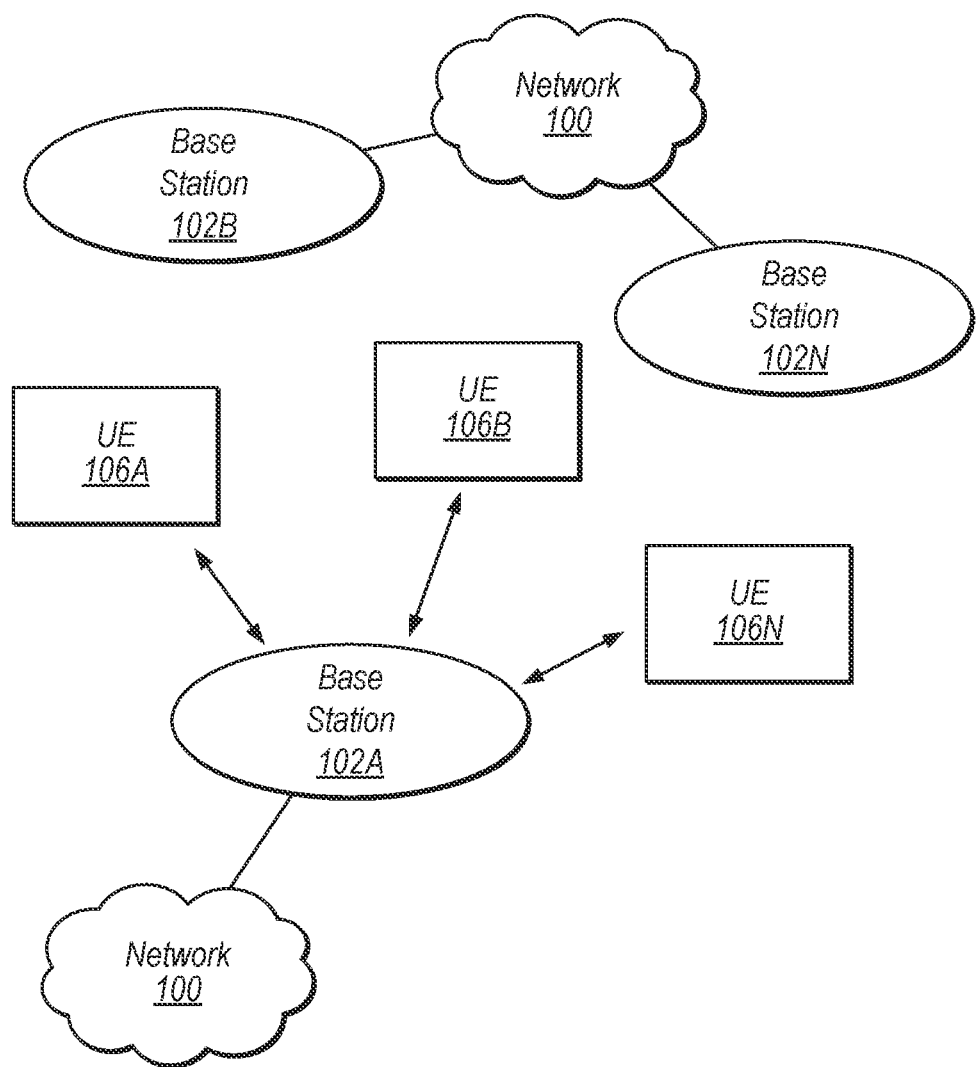
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
UL-CA: Uplink Carrier Aggregation
FR: Frequency Range
PCC: Primary Component Carrier
SCC: Secondary Component Carrier
LB: Low Band
MB: Mid Band
HB: High Band
UHB: Ultra-High Band
TRP: Total Radiated Power
RSRP: Reference Signal Received Power
PUCCH: Physical Uplink Control Channel
RACH: Random Access Channel
BW: Bandwidth

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications.

Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
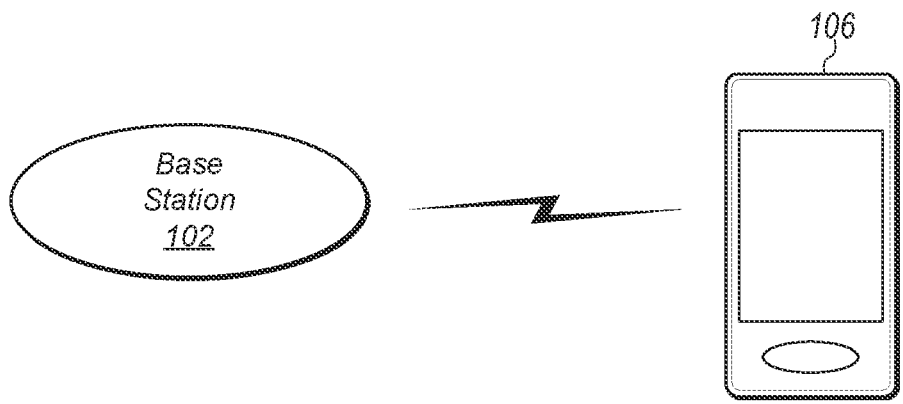
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPoints). In addition, a UE capable of operating according to 5G NR may be connected to one or more TRPoints within one or more gNBs. For example, it may be possible that that the base station 102A and one or more other base stations 102 support joint transmission, such that UE 106 may be able to receive transmissions from multiple base stations (and/or multiple TRPoints provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
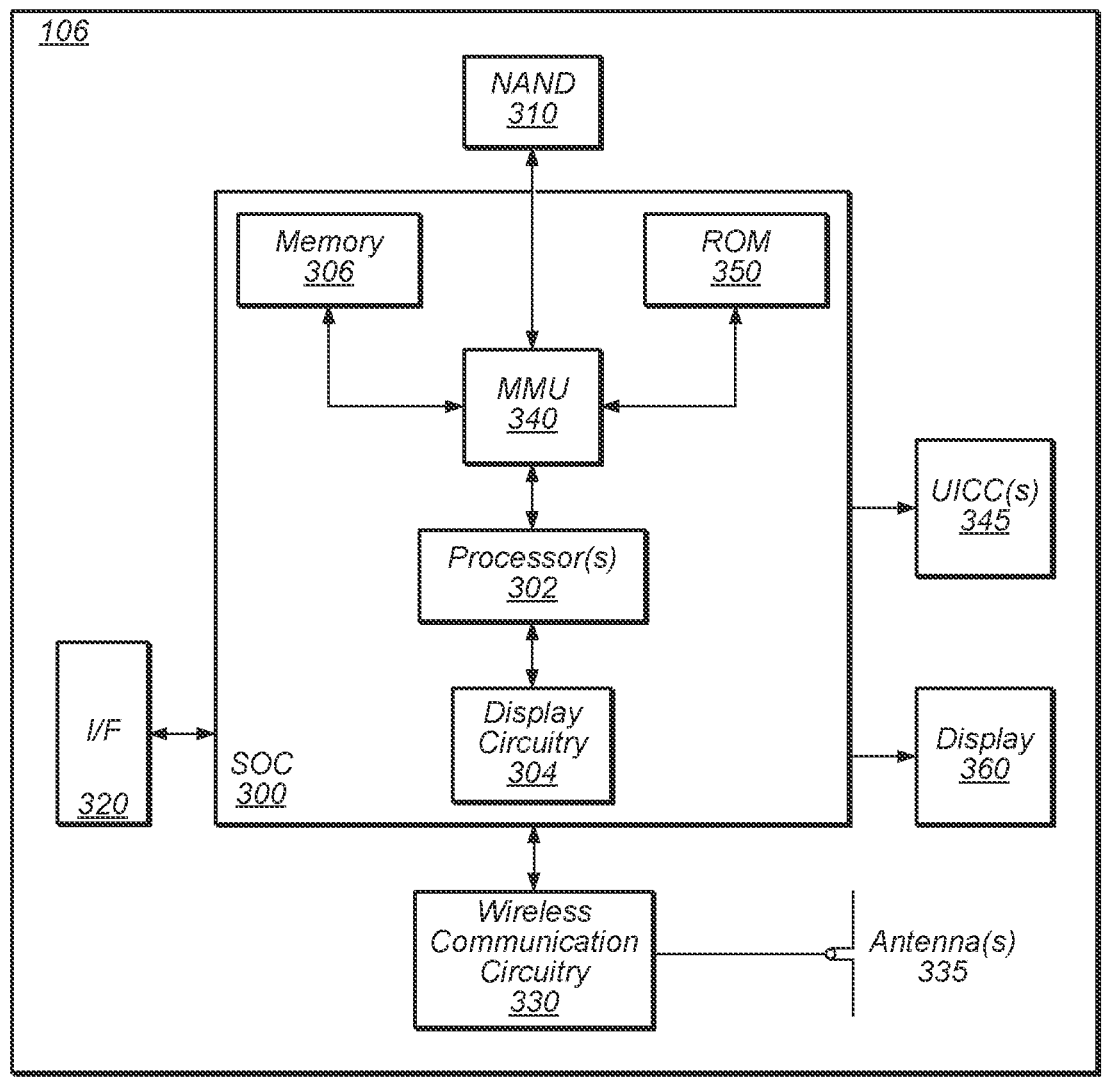
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
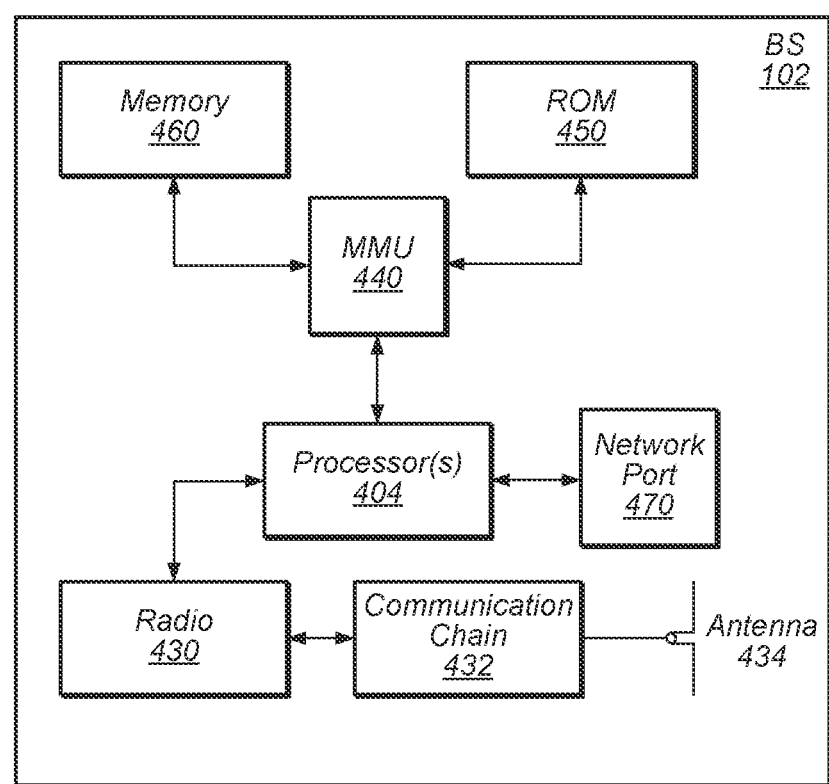
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPoints). In addition, a UE capable of operating according to 5G NR may be connected to one or more TRPoints within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
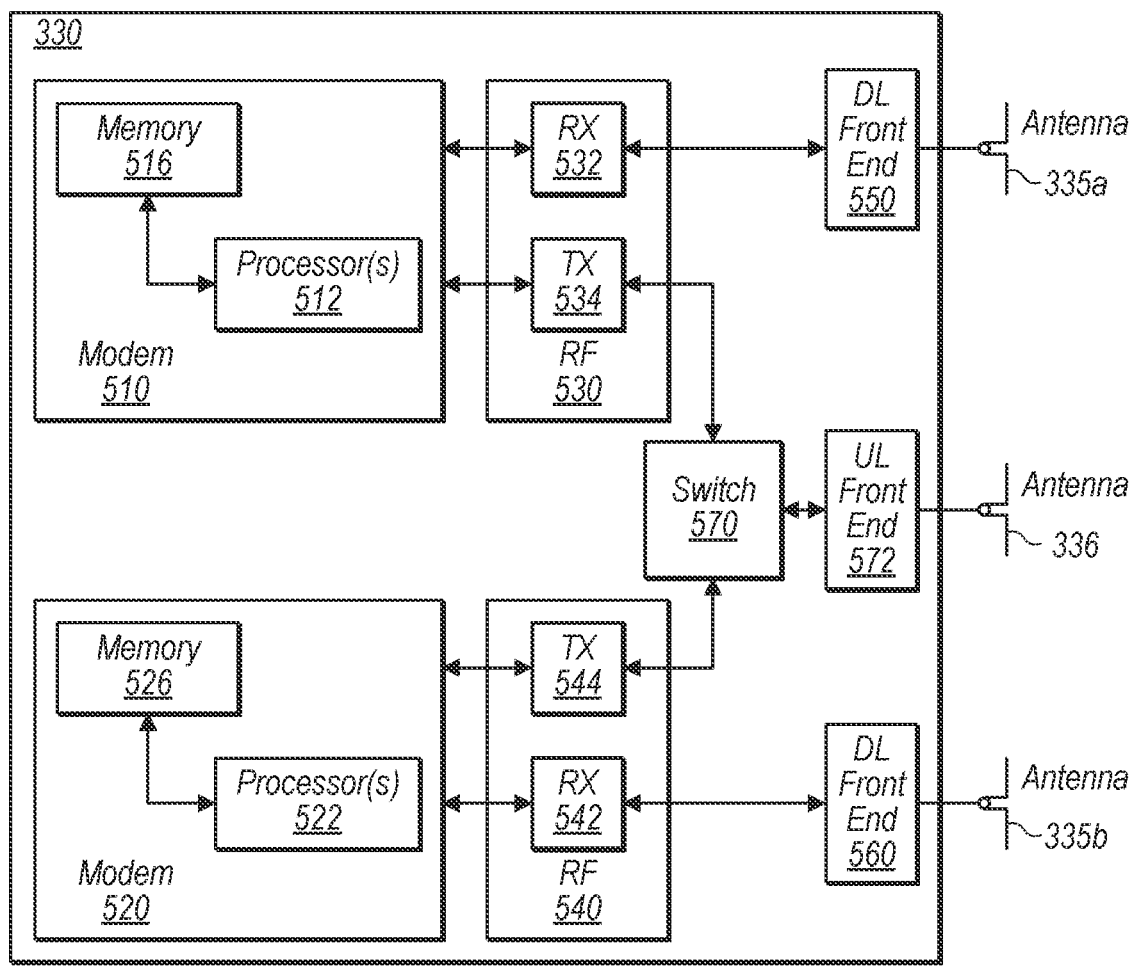
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPoints). In addition, a UE capable of operating according to 5G NR may be connected to one or more TRPoints within one or more gNBs. For example, it may be possible that the base station 102A and one or more other base stations 102 support joint transmission, such that UE 106 may be able to receive transmissions from multiple base stations (and/or multiple TRPoints provided by the same base station).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
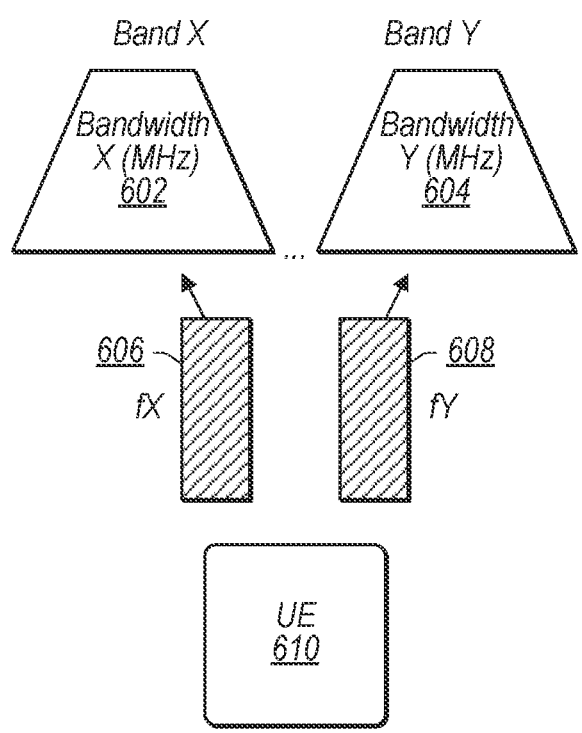
FIG. 6 is an example block diagram illustrating aspects of uplink carrier aggregation through utilization of two carriers, according to some embodiments.

FIG. 6—Uplink Carrier Aggregation

FIG. 6 is an example block diagram illustrating aspects of uplink carrier aggregation (UL-CA), according to some embodiments. More specifically, FIG. 6 illustrates the principle of UL-CA where a UE 610 may be configured to transmit simultaneously on two contiguous or non-contiguous carriers. Moreover, it may be possible for the UE to use the same antenna port or multiple antenna ports (e.g., antenna(s)) to transmit on the multiple uplink carriers.

For example, FIG. 6 illustrates two carriers (e.g., X and Y) corresponding to certain channel bandwidths (e.g., Bandwidth X 602 and Bandwidth Y 604) associated with their respective bands (e.g., Band X and Band Y). Furthermore, FIG. 6 illustrates that a UE 610 may be able to transmit simultaneously on the two carriers using two different frequencies fX 606 and fY 608. In some embodiments, Band X and Band Y may be contiguous such that their frequency bands share a common or neighboring frequency border (e.g., the frequency bands lie next to one another such as Long Term Evolution (LTE) Band 13 and LTE Band 14). Additionally or alternatively, the two bands may be non-contiguous (e.g., LTE Band 2 and LTE Band 13) corresponding to frequency bands with one or more frequency gaps in between them.

In some embodiments, Bandwidth X 602 and Bandwidth Y 604 may be similar or the same bandwidths. For example, Bandwidth X 602 and Bandwidth Y 604 may each correspond to a bandwidth of 20 MHz. Additionally or alternatively, Bandwidth X 602 and Bandwidth Y 604 may be characterized by a variety of different channel bandwidths. For example, Bandwidth X 602 may be a 20 MHz bandwidth while Bandwidth Y 604 may characterized by a bandwidth of 10 MHz, according to some embodiments. According to further embodiments, a UE 610 may utilize frequency fX 606 to communicate using Bandwidth X 602 corresponding to Band X. Additionally or alternatively, the UE 610 may also use frequency fY 608 to communicate using a channel bandwidth such as Bandwidth Y 604 corresponding to Band Y. While some of the embodiments described above utilize examples of LTE Bands and their corresponding frequencies and bandwidths (among other characteristics), FIG. 6 could also describe scenarios of UL-CA utilizing various examples of New Radio (NR) Bands and their corresponding frequencies and channel bandwidths (among other characteristics).

Uplink Carrier Aggregation Antenna Contention Resolution

In some legacy systems, user equipment (UE) may not have been configured or designed to support transmission (Tx) operations on the same antenna port or multiple antenna ports to transmit on multiple uplink carriers for inter-band UL-CA. For example, the selection of the antenna ports for inter-band UL-CA may be based on the receive (Rx) monitoring for Primary Component Carrier 1 (PCC1) and PCC2. More specifically, the receive monitoring may have involved monitoring two Rx antenna ports (e.g., antennas) for low band (LB) and 4 Rx antenna ports for mid band (MB), high band (HB), or ultra-high band (UHB). In some embodiments, LB may correspond to frequencies less than or equal to 1 GHz, MB may correspond to frequencies between 1 and 2 GHz, HB may correspond to frequencies between 2 and 3 GHz and UHB may correspond to frequencies between 3 and 6 GHz.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

Accordingly, this transmission failure or error could result in a degraded cellular performance especially in scenarios in which transmission power is limited due to Tx backoff (e.g., backing off/lowering the transmit power). For example, the higher frequency bands MB/HB/UHB may utilize higher Tx backoff values as compared to LB. These transmission power backoff values may be characterized or utilized as such to help mitigate distortions associated with the transmissions (e.g., intermodulation or harmonic distortions, etc.). Additionally or alternatively, current network implementation signaling may only be supported on PCC1 for both the carriers. This could also result in degraded signaling performance if the MB/HB/UHB carrier is assigned to PCC1 which has high Tx backoff.

One objective that may be targeted in cellular communication technology developments, potentially including in 3GPP cellular technologies such as LTE and NR, may include increasing the uplink data rate. New cellular communication techniques are continually under development, to increase coverage, to better serve the range of demands and use cases, and for a variety of other reasons. One technique for improving a user's experience may involve uplink carrier aggregation (UL-CA). For example UL-CA may be utilized in different ways to enable the UE to transmit on multiple uplink carriers simultaneously. In other words, the UE may be able to transmit simultaneously on two carriers of different frequencies. In doing so, this may help to increase the uplink data rate and in turn provide a better user experience. However, it may be beneficial to expand the current approach to take into the account total radiated power (TRP) and the bandwidth of the frequency carriers before making a decision regarding the assignment of antenna ports used for transmission. Accordingly, improvements in the field are desired.

Figure 7:
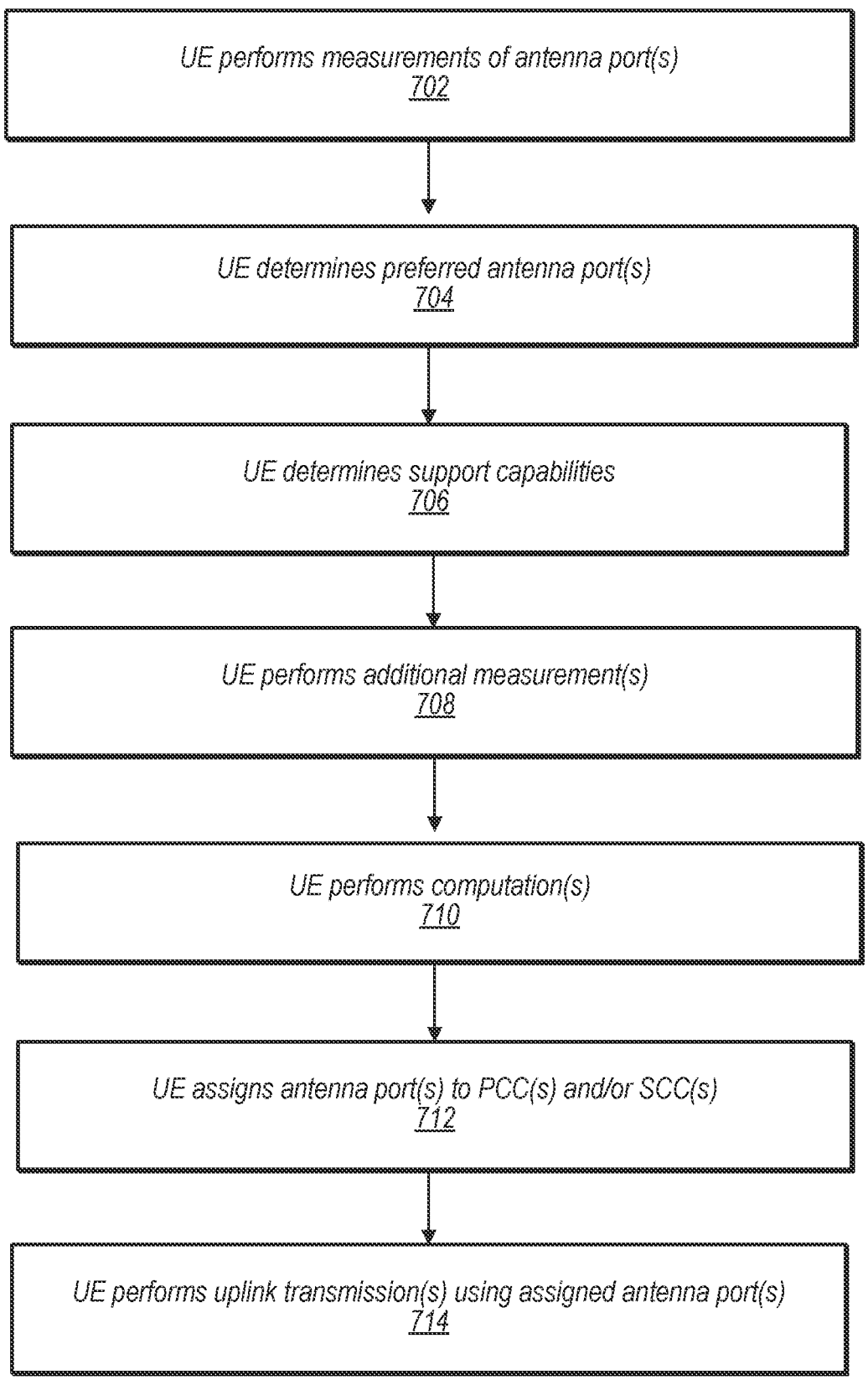
FIG. 7 is a flow diagram illustrating aspects of an example method for uplink carrier aggregation antenna contention resolution, according to some embodiments.

FIG. 7—Method for Uplink Carrier Aggregation Antenna Contention Resolution

FIG. 7 is a communication flow diagram illustrating example aspects of a method for UL-CA antenna contention resolution, at least according to some embodiments.

Aspects of the method of FIG. 7 may be implemented by a wireless device 106 (such as a UE 106 illustrated in various of the Figures herein), network (e.g., which may be provided by one or more base stations such as a BS 102 illustrated in various of the Figures herein), and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

It should be noted that while the techniques of FIG. 7 are described primarily in conjunction with UL-CA antenna contention resolution, various of the techniques described herein may also or alternatively be applicable in any of various other scenarios.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 702, the wireless device may perform one or more downlink (DL) measurements of one or more antenna ports associated with the one or more antennas, according to some embodiments. More specifically, the wireless device may perform DL reference signal received power (RSRP) measurements of the carriers using reference signals, according to some embodiments.

In 704, the wireless device may determine, based on the one or more downlink measurements, one or more preferred antenna ports of the one or more antenna ports for at least one primary component carriers (PCCs) and at least one secondary component carriers (SCCs), according to some embodiments. For example, the UE may have determined or be aware that at least two of one or more PCCs and/or SCCs (or combination of the two) should utilize the same antenna for uplink transmission based on the RSRP measurements of the carriers. In other words, in the example, two (or more) carriers may use the same antenna port (or antenna) for uplink transmission (e.g., based on the RSRP measurements). The two (or more) carriers may both be PCC, both be SCCs, and/or a mix of PCCs and SCCs.

In 706, the wireless device may determine one or more support capabilities of the wireless device and network corresponding to the at least one PCC and the at least one SCC utilizing the one or more preferred antenna ports for uplink transmission, according to some embodiments. In some embodiments, the wireless device may determine one or more additional capabilities of least one of the network or the wireless device corresponding to support of at least one of a physical uplink control channel (PUCCH) or a random access channel (RACH) on the at least one SCC. According to some embodiments, the wireless device's determining of the one or more capabilities may be in response to an event trigger. Moreover, the event trigger may comprise at least one of a periodic timer, a handover procedure, a change in cellular state, a change in radio access technology (RAT), exiting a service area, or entering an airplane mode, according to some embodiments. Additionally or alternatively, a change in cellular state may corresponds to changing states between at least one of an idle state, a connected state, or an out-of-service (OOS) state.

In 708, the wireless device may perform one or more additional measurements of the one or more preferred antenna ports corresponding to the at least one PCC and at least one SCC and one or more computations using the one or more additional measurements, according to some embodiments. In some embodiments, the one or more additional measurements may comprise reference signal received power (RSRP) measurements of at least one of the at least one PCC and at least one SCC. Additionally or alternatively, the one or more measurements may comprise total radiated power (TRP) measurements of at least one of the at least one PCC and at least one SCC. According to some embodiments, the one or more measurements may include using one or more bandwidths (BWs) of the at least one PCC and at least one SCC, according to some embodiments. Additionally or alternatively, the one or more BWs may correspond to at least one of single band BWs or aggregated BWs for contiguous bands.

In 710, the wireless device may perform one or more computations using the one or more additional measurements, according to some embodiments. According to further embodiments, the one or more computations may comprise applying a scaling factor for the TRP measurements of at least one SCC. In some embodiments, the one or more computations may include applying a weighting factor for the one or more BWs. Additionally or alternatively, the wireless device may determine, based on one or more additional computations, that an additional PCC or an additional SCC of the at least one SCC associated with the network should utilize a second preferred antenna port of the one or more antennas.

In 712, the wireless device may assign, based on the one or more computations, the one or more preferred antenna ports to the at least one PCC and at least one SCC for uplink transmission, according to some embodiments. In some embodiments, assigning the one or more preferred antenna ports to the at least one PCC and at least one SCC for uplink transmission may include prioritizing a first PCC of the at least one PCC such that it is assigned a first antenna port of the one or more preferred antenna ports. Additionally or alternatively, assigning the one or more preferred antenna ports to the at least one PCC and at least one SCC for uplink transmission may include prioritizing a first SCC of the at least one SCC such that it is assigned a first antenna port of the one or more preferred antenna ports.

In 714, the wireless device may perform, on the one or more preferred antenna ports (e.g., antenna(s)), uplink transmission using the respectively assigned at least one PCC and at least one SCC, according to some embodiments.

In other words, the method presented may allow the wireless device may make an antenna selection decision by taking into account the Rx measurements (e.g., RSRP), TRP and the bandwidth of the two carriers, according to some embodiments. According to some embodiments, the wireless device's determining of the one or more capabilities and ultimately allocating respective transmission antennas to relevant PCC(s) and/or SCC(s) may be in response to an event trigger. Accordingly, this approach may be beneficial in a cell edge scenarios in terms of better uplink throughput and signaling performance.

In some embodiments, the method presented may be utilized if the number of Rx antenna ports is increased from 4 to 6 or even to 8 (or more) Rx antenna ports (or antennas). Moreover, the method presented may be utilized in the case of multiple UL-CA scenarios corresponding to 2, 4, or 8 CAs, according to some embodiments. In some embodiments, the method may be beneficially utilized if both PCC1 and PCC2 support signaling for individual carriers respectively.

It should be noted, however, that the example details illustrated in and described with respect to FIG. 7 are not intended to be limiting to the disclosure as a whole: numerous variations and alternatives to the details provided herein below are possible and should be considered within the scope of the disclosure.

Figure 8A:
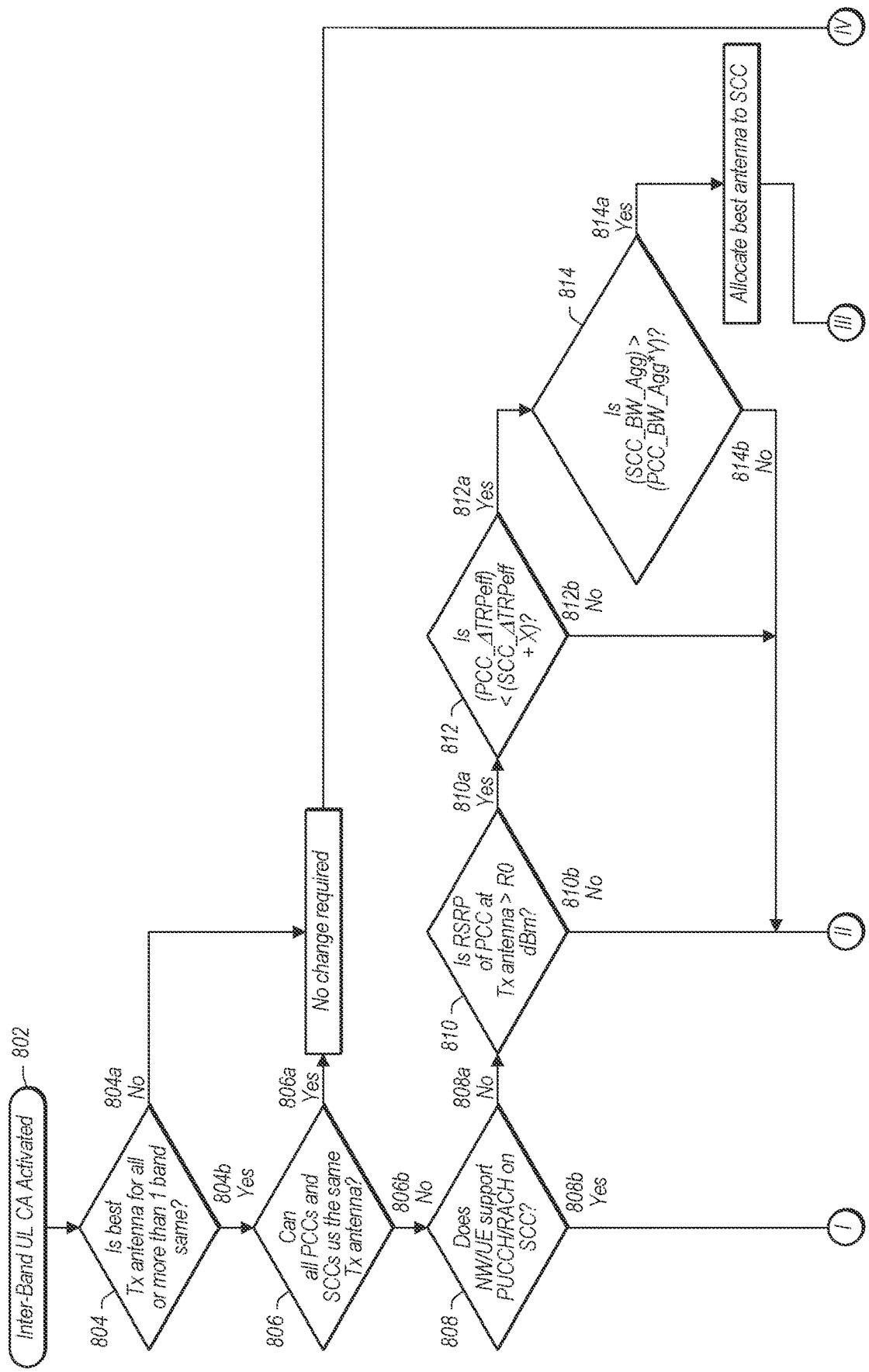
FIGS. 8A and 8B illustrate two parts of a flow diagram directed toward aspects of an example method for uplink carrier aggregation antenna contention resolution, according to some embodiments.

FIG. 8A—Method for Uplink Carrier Aggregation Antenna Contention Resolution (Part 1)

FIG. 8A is a flow diagram illustrating a first part or portion of example aspects of a method for UL-CA antenna contention resolution, at least according to some embodiments.

In 802, a UE may be configured to activate inter-band uplink carrier aggregation. For example, the UE may perform such activation when in a scenario similar to FIG. 6 involving two contiguous or non-contiguous carriers. In some embodiments, different networks may, depending on their implementation, add secondary cells for use in uplink carrier aggregation. According to some embodiments, some networks may, when adding secondary cells, require the UE to send a measurement report. Additionally or alternatively, some networks may add secondary cells blindly, according to some embodiments.

In 804, the UE may determine if the best transmission (TX) antenna for all or more than one band is the same. In 804a, if the best TX antenna for all or more than one band is not the same, then no further determinations may need to be made and the UE may not need to make any further determinations at that time and proceed to await a periodic timer or event trigger 826 of FIG. 8B (e.g., via the circled IV point). Alternatively, in 804b, if the best TX antenna for all or more than one band is the same, the UE may further determine if all the primary component carriers (PCCs) and secondary component carriers (SCCs) can use the same antenna. For example, the UE may not support or be configured to support sharing the same antenna between two frequency bands which are inter-band (e.g., the component carriers belong to the same operating frequency band).

In alternative embodiments, if the two frequency bands are considered to be intra-band (e.g., the component carriers belong to different operating frequency bands), the UE may support or be configured to support sharing a same antenna between the bands. Accordingly in 806, if the UE determines that the primary component carriers (PCCs) and secondary component carriers (SCCs) can use the same antenna as in 806a, then no further changes may be required and the UE may assign the appropriate TX antenna(s) to the relevant PCC(s) and/or SCC(s). Alternatively, if the UE determines that the primary component carriers (PCCs) and secondary component carriers (SCCs) cannot use the same antenna as in 806b, then the UE may need to make further determinations at that point in time and proceed to await a periodic timer or event trigger 826 of FIG. 8B (via the circled IV point).

According to some embodiments, following 806b, the UE may perform a determination in 808 regarding whether or not the network (NW) or UE supports at least one of a physical uplink control channel (PUCCH) or random access channel (RACH) on a secondary component carrier (SCC). If the determination is made that the NW and UE does support PUCCH and/or RACH on the SCC as in 808b, the UE may proceed to 818 of FIG. 8B (via the circled I point) to compute various coefficients or parameters regarding total radiated power (TRP) of the PCC(s) and/or SCC(s).

Additionally or alternatively, if the determination is made that the NW and/or UE does not support PUCCH and/or RACH on the SCC as in 808a, the UE may proceed to 810 to make further determinations regarding various measurements of the PCC(s) and SCC(s), according to some embodiments. For example, in 810, the UE may determine whether or not the reference signal received power (RSRP) of the PCC(s) at the transmitting antenna is greater than a factor $R_0$. Accordingly, if factor $R_0$ was −100 dBm (as one example) and the RSRP was −105 dBm (decibel-milliwatts) at the transmitting antenna, the UE may be aware or determine that the RSRP is less than $R_0$ (as in 810b) and proceed to allocate the best antenna to the PCC as in FIG. 8B (via the circled II point). In other words, the UE may be able to prioritize or give priority to the PCC such that it is assigned the best performing transmitting antenna (or antenna port). Additionally or alternatively, if factor $R_0$ was −100 dBm and the RSRP was −95 dBm at the transmitting antenna, the UE may be aware or determine that the RSRP is greater than $R_0$ (as in 810a) and may need to make further determinations as in 812 before assigning the best performing antenna to the PCC.

For example, in 812, the UE may further be configured to determine if a total radiated power (TRP) coefficient or parameter of the PCC (e.g., $PCC_{\Delta TRPeff}$) is less than a TRP coefficient or parameter of the SCC plus a weighting factor X (e.g., $SCC_{\Delta TRPeff}$+X). In some embodiments, ΔTRPeff may correspond to a difference between an effective TRP measurement of the current antenna and an effective TRP measurement of the new antenna (e.g., ΔTRPeff=TRPeff_currentAnt−TRPeff_NewAnt). Moreover, the effective TRP measurement (TRPeff) may correspond to a TRP measurement minus a pathloss measurement (e.g., TRPeff=TRP−Pathloss). Furthermore, the pathloss measurement may correspond to a difference between the power of a transmitted reference signal and the reference signal received power (e.g., Pathloss=RS power−RSRP).

Figure 8B:
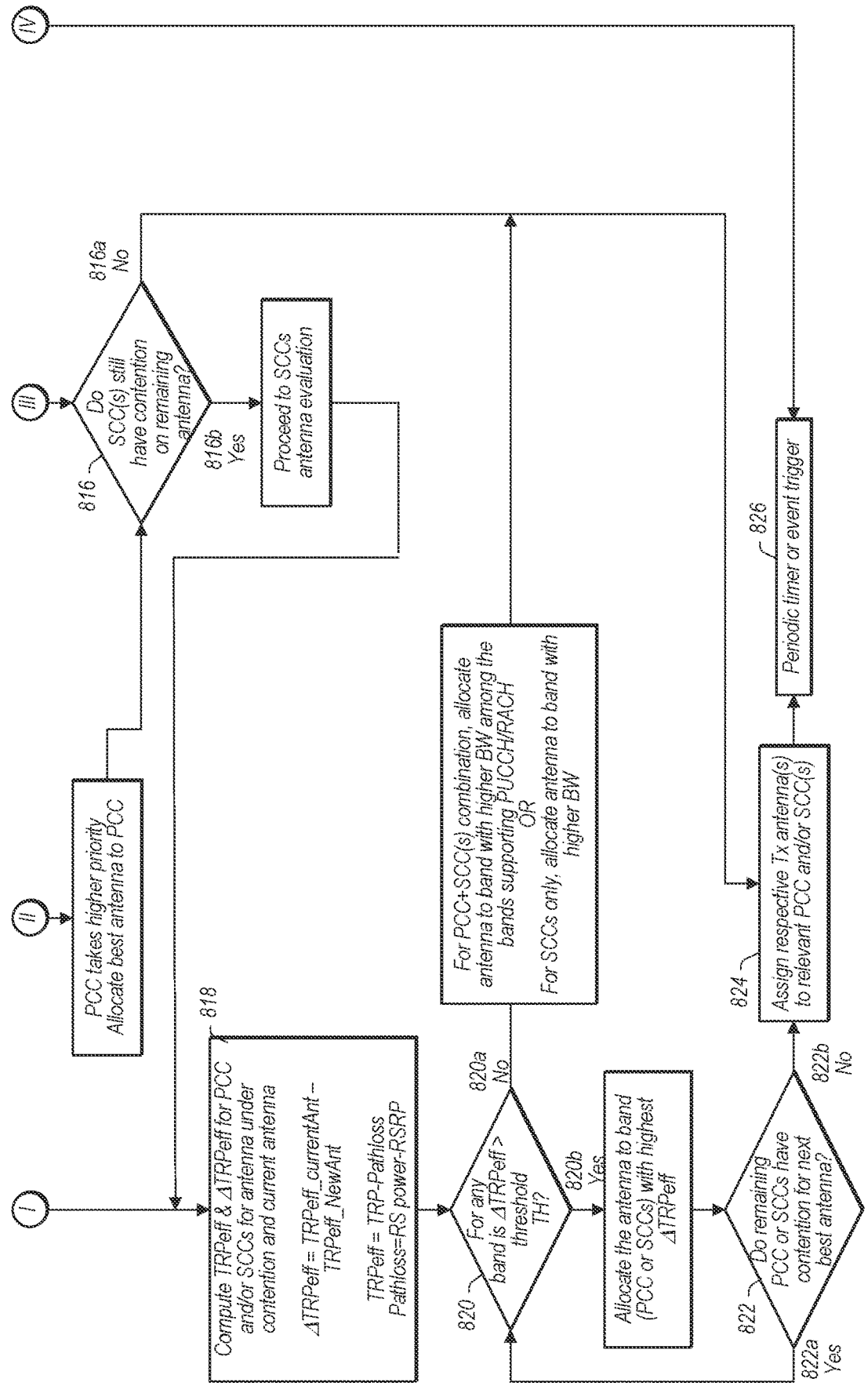

Accordingly, if the UE determines that $PCC_{\Delta TRPeff}$ is greater than $SCC_{\Delta TRPeff}$+X (as in 812b), the UE may proceed via the circled II point of FIG. 8B and prioritize or give priority to the PCC such that it is assigned the best performing transmitting antenna (or antenna port). Additionally or alternatively, if the UE determines that PCCA TRPeff is less than $SCC_{\Delta TRPeff}$+X (as in 812a), the UE may need to perform additional determinations or measurements regarding the PCC(s) and/or SCC(s) and proceed to 814.

According to some embodiments, in 814 the UE may make further determinations regarding the bandwidths (BW) corresponding to the PCC(s) and SCC(s). More specifically, the UE may determine whether a factor corresponding to the bandwidth of the SCC (e.g., SCC_BW_Agg) is greater than a factor corresponding to the bandwidth of the PCC (e.g., PCC_BW_Agg) multiplied by some weighting factor or scale Y (e.g., PCC_BW_Agg*Y. Moreover, factors SCC_BW_Agg and PCC_BW_Agg may correspond to the bandwidth of a single band or an aggregated bandwidth if the carriers are contiguous in frequency bands. Accordingly, if the UE determines that SCC_BW_Agg is less than PCC_BW_Agg*Y (as in 814b), the UE may allocate the best antenna to the PCC as via the circled II point of FIG. 8B. Additionally or alternatively, if the UE determines that SCC_BW_Agg is greater than PCC_BW_Agg*Y (as in 814a), the UE may allocate the best antenna to the SCC and further proceed to 816 of FIG. 8B (via the circled III point).

FIG. 8B—Method for Uplink Carrier Aggregation Antenna Contention Resolution (Part 2)

FIG. 8B is a flow diagram illustrating a second part or portion of example aspects of a method for UL-CA antenna contention resolution, at least according to some embodiments. More specifically, the method may be continued from FIG. 8A to FIG. 8B via the circled I, II, III, and IV points in their respective flow diagrams.

In some embodiments, if the UE has made determinations resulting in the paths corresponding to 810b, 812b, and/or 814b, the UE may further, having already allocated the best antenna to the PCC (e.g., giving it higher priority) via the circled II point, proceed to 816 to determine whether or not the SCC(s) are still in contention for remaining antenna(s). For example, if the UE determines that the SCC(s) are not in contention for the remaining antenna(s) (as in 816a), the UE may proceed directly to 824 and assign respective Tx antenna(s) to the relevant PCC and/or SCC, according to some embodiments. Additionally or alternatively, if the UE determines that the SCC(s) are in contention for the remaining antenna(s) (as in 816b), the UE may proceed with additional antenna evaluations of the SCC(s) as in 818.

Accordingly, in 818 the UE may compute certain coefficients or parameters such as TRPeff and ΔTRPeff for the PCC(s) and/or SCC(s) for the current antenna and any antenna(s) under contention. In some embodiments, ΔTRPeff may correspond to the difference between an effective TRP measurement of the current antenna and an effective TRP measurement of the new antenna (e.g., ΔTRPeff=TRPeff_currentAnt−TRPeff_NewAnt). Moreover, the effective TRP measurement (TRPeff) may correspond to a TRP measurement minus a pathloss measurement (e.g., TRPeff=TRP−Pathloss). Furthermore, the pathloss measurement may correspond to a difference between the power of a transmitted reference signal and the reference signal received power (e.g., Pathloss=RS power−RSRP).

In some embodiments, the UE may then proceed to 820 to determine if ΔTRPeff for any band is greater than a threshold value (TH) (e.g., ΔTRPeff>TH). Accordingly, if the UE is aware or determines that ΔTRPeff is less than the threshold value (as in 820a), the UE may proceed to allocate antenna(s) to bands with higher BWs among the bands supporting PUCCH/RACH for combinations of PCC(s) and SCC(s). Additionally or alternatively, the UE may allocate antenna(s) to bands with higher BWs for the SCC(s) only, according to some embodiments. Moreover, the UE may further proceed from 820a to 824 to assign respective Tx antenna(s) to respective PCC(s) and/or SCC(s) and ultimately to 826 to await an event trigger or periodic timer event.

In some embodiments, if the UE is aware or determines that ΔTRPeff is greater than the threshold value (as in 820b), the UE may proceed to allocate the antenna to a band (PCC or SCC(s)) with the highest ΔTRPeff and make a further determination in 822 regarding whether or not any remaining PCC(s) or SCC(s) have contention for the next best antenna. Accordingly, if the remaining PCC(s) or SCC(s) are not contesting for the next best antenna, the UE may proceed to 824 to assign respective Tx antenna(s) to respective PCC(s) and/or SCC(s) and ultimately to 826 to await an event trigger or periodic timer event. According to some embodiments, event triggers may include events such as a change in cellular states such as an idle state, a connected state, or an out-of-service (OOS) state, among other various states. Additionally or alternatively, event triggers may include a change in radio access technology (RAT), a handover procedure, and/or entering certain modes such as airplane mode.

Additionally or alternatively, if the remaining PCC(s) or SCC(s) are contesting for the next best antenna, the UE may proceed to back to 820 to determine if ΔTRPeff for any band is greater than a threshold value (TH) (e.g., ΔTRPeff>TH) for the remaining PCC(s) or SCC(s). The UE may then once again proceed to 822 and/or 824 and 826 depending on the determinations made at 820 and 822.

Note also that the techniques described herein may be applied to either or both of NR and LTE uplink carrier aggregation techniques, according to various embodiments.

Still another example embodiment may include a device, comprising: an antenna; a radio coupled to the antenna; and a processing element operably coupled to the radio, wherein the device is configured to implement any or all parts of the preceding examples.

Yet another example embodiment may include a method, comprising: by a device: performing any or all parts of the preceding examples.

A further exemplary embodiment may include a non-transitory computer accessible memory medium comprising program instructions which, when executed at a device, cause the device to implement any or all parts of any of the preceding examples.

A still further example embodiment may include a computer program comprising instructions for performing any or all parts of any of the preceding examples.

A yet further example embodiment may include an apparatus comprising means for performing any or all of the elements of any of the preceding examples.

Still another example embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   one or more antennas;
   at least one processor coupled to the one or more antennas and configured to cause the wireless device to:
   perform one or more downlink measurements of one or more antenna ports associated with the one or more antennas;
   determine, based on the one or more downlink measurements, one or more preferred antenna ports of the one or more antenna ports for at least one primary component carrier (PCC) and at least one secondary component carrier (SCC);
   determine one or more support capabilities of the wireless device and network corresponding to the at least one PCC and the at least one SCC utilizing the one or more preferred antenna ports for uplink transmission, wherein at least one of the one or more support capabilities correspond to support of at least one of a physical uplink control channel (PUCCH) or a random access channel (RACH) on the at least one SCC;
   perform one or more additional measurements of the one or more preferred antenna ports corresponding to the at least one PCC and at least one SCC;
   perform, using the one or more additional measurements, one or more computations;
   assign, based on the one or more computations, the one or more preferred antenna ports to the at least one PCC and at least one SCC for uplink transmission; and
   perform, on the one or more preferred antenna ports, uplink transmission using the respectively assigned at least one PCC and at least one SCC.

2. The wireless device of claim 1, wherein the at least one processor is further configured to cause the wireless device to:
   determine, based on one or more additional computations, that an additional PCC or an additional SCC of the at least one SCC associated with the network should utilizes a second preferred antenna port of the one or more antennas.

3. The wireless device of claim 1, wherein the one or more additional measurements comprise reference signal received power (RSRP) measurements of at least one of the at least one PCC and at least one SCC.

4. The wireless device of claim 1, wherein the one or more additional measurements comprise total radiated power (TRP) measurements of at least one of the at least one PCC and at least one SCC.

5. The wireless device of claim 4, wherein the one or more computations comprise applying a scaling factor for the TRP measurements of the at least one SCCs.

6. The wireless device of claim 1, wherein the one or more computations include using one or more bandwidths (BWs) of the at least one PCC and at least one SCCs.

7. The wireless device of claim 6, wherein the one or more BWs correspond to at least one of single band BWs or aggregated BWs for contiguous bands.

8. The wireless device of claim 6, wherein the one or more computations comprise applying a weighting factor for the one or more BWs.

9. The wireless device of claim 1, wherein determining the one or more support capabilities is in response to an event trigger, and wherein the event trigger comprises at least one of:
   a periodic timer, a handover procedure, a change in cellular state, a change in radio access technology (RAT), exiting a service area, or entering airplane mode.

10. The wireless device of claim 9, wherein a change in cellular state corresponds to changing states between at least one of:
    an idle state,
    a connected state, or
    an out-of-service (OOS) state.

11. An apparatus, comprising:
    a processor configured to, when executing instructions stored in a memory, perform operations comprising:
    performing one or more downlink measurements of one or more antenna ports associated with the one or more antennas;

determining, based on the one or more downlink measurements, one or more preferred antenna ports of the one or more antenna ports for at least one primary component carrier (PCC) and at least one secondary component carrier (SCC);

determining one or more support capabilities of a user equipment (UE) and network corresponding to the at least one PCC and the at least one SCC utilizing the one or more preferred antenna ports for uplink transmission, wherein at least one of the one or more support capabilities correspond to support of at least one of a physical uplink control channel (PUCCH) or a random access channel (RACH) on the at least one SCC;

performing one or more additional measurements of the one or more preferred antenna ports corresponding to the at least one PCC and at least one SCC;

performing, using the one or more additional measurements, one or more computations;

assigning, based on the one or more computations, the one or more preferred antenna ports to the at least one PCC and at least one SCC for uplink transmission; and performing, on the one or more preferred antenna ports, uplink transmission using the respectively assigned at least one PCC and at least one SCC.

12. The apparatus of claim 11, wherein assigning the one or more preferred antenna ports to the at least one PCC and at least one SCC for uplink transmission comprises:
prioritizing a first PCC of the at least one PCC such that it is assigned a first antenna port of the one or more preferred antenna ports.

13. The apparatus of claim 11, wherein assigning the one or more preferred antenna ports to the at least one PCC and at least one SCC for uplink transmission comprises:
prioritizing a first SCC of the at least one SCC such that it is assigned a first antenna port of the one or more preferred antenna ports.

14. The apparatus of claim 11, wherein the one or more additional measurements comprise total radiated power (TRP) measurements of the at least one PCC and at least one SCC.

15. The apparatus of claim 11, wherein the one or more additional computations include using one or more bandwidths (BWs) of the at least one PCC and at least one SCC.

16. A non-transitory computer readable medium storing program instructions executable by one or more processors to cause a user equipment (UE) to:
perform one or more downlink measurements of one or more antenna ports associated with one or more antennas of the UE;
determine, based on the one or more downlink measurements, one or more preferred antenna ports of the one or more antenna ports for at least one primary component carrier (PCC) and at least one secondary component carrier (SCC);
determine one or more support capabilities of the UE and network corresponding to the at least one PCC and the at least one SCC utilizing the one or more preferred antenna ports for uplink transmission, wherein at least one of the one or more support capabilities correspond to support of at least one of a physical uplink control channel (PUCCH) or a random access channel (RACH) on the at least one SCC;
perform one or more additional measurements of the one or more preferred antenna ports corresponding to the at least one PCC and at least one SCC;
perform, using the one or more additional measurements, one or more computations;
assign, based on the one or more computations, the one or more preferred antenna ports to the at least one PCC and at least one SCC for uplink transmission; and
perform, on the one or more preferred antenna ports, uplink transmission using the respectively assigned at least one PCC and at least one SCC.

17. The non-transitory computer readable medium of claim 16, wherein assigning the one or more preferred antenna ports to the at least one PCC and at least one SCC for uplink transmission comprises:
prioritizing a first SCC of the at least one SCC such that it is assigned a first antenna port of the one or more preferred antenna ports.

18. The non-transitory computer readable medium of claim 7, wherein the one or more additional measurements comprise total radiated power (TRP) measurements of the at least one PCC and at least one SCC.

19. The non-transitory computer readable medium of claim 7, wherein the one or more computations include using one or more bandwidths (BWs) of the at least one PCC and at least one SCC.

20. The non-transitory computer readable medium of claim 16, wherein determining the one or more support capabilities is in response to an event trigger, and wherein the event trigger comprises at least one of:
a periodic timer, a handover procedure, a change in cellular state, a change in radio access technology (RAT), exiting a service area, or entering airplane mode.

* * * * *

UNITED STATES PATENT AND TRADEMARK OFFICE
CERTIFICATE OF CORRECTION

PATENT NO. : 12,389,247 B2
APPLICATION NO. : 17/830156
DATED : August 12, 2025
INVENTOR(S) : Vijendrakumar K. Ashiwal et al.

Page 1 of 1

It is certified that error appears in the above-identified patent and that said Letters Patent is hereby corrected as shown below:

In the Claims

Column 22, Line 25, delete "should"

Signed and Sealed this
Ninth Day of September, 2025

Coke Morgan Stewart
*Acting Director of the United States Patent and Trademark Office*